Patented Nov. 13, 1934

1,980,414

UNITED STATES PATENT OFFICE 1,980,414

PROCESS FOR THE PRODUCTION OF SULPHO - ACIDS OF HIGH MOLECULAR WEIGHT

Kurt Lindner, Oranienburg, Germany, assignor, by mesne assignments, to Oranienburger Chemische Fabrik Aktiengesellschaft, Oranienburg, Germany, a company of Germany No Drawing. Application July 30, 1927, Serial No. 209,645. In Germany August 2, 1926

16 Claims. (Cl. 260—159)

The present invention relates to a process for the production of sulpho-acids of high molecular weight, which are adapted, either per se or in the form of their salts, to be employed as purifying, wetting or saturating agents in the textile, leather and paper industries and are furthermore, suitable for bringing water-insoluble substances into aqueous dispersions such as emulsions and pseudo-solutions. Consequently, the products obtained according to the invention are also suitable for making pastes of dyes and as lipolytics (agents for fat-splitting). It has also been observed that the products are excellently adapted to be used for the so called "stabilization" of dyestuff solutions, particularly of vat dyes; it is possible by the addition of such materials to keep freshly made up or even used vat dyes for a long period in an unaltered condition.

This process resides in the sulphonation of aliphatic substances of high molecular weight, and for example the fatty bodies, resins, such as ordinary rosin, tar fractions which are largely aliphatic, and naphthene acids under which term oils from acid sludge are commonly designated. The sulphonation is accomplished by means of sulphuric acid halo-hydrins, particularly chloro-sulphonic acid. I have shown that the sulphonation of such bodies by chloro-sulphonic acid yields products which differ in their action from the preparations produced according to the previous sulphonation methods, and are also in particular superior to these previous preparations, for example Turkey-red oils, alkylated naphthalene-sulpho acids etc., in respect of penetrating and wetting ability and above all in that they are resistant towards acids, alkalies, salts and lime, to a far greater extent than the previous sulphonated products and are, moreover, water soluble even in the form of their calcium and magnesium salts.

The special properties of the sulphuric acid halo-hydrins, particularly of chloro-sulphonic acid allow the sulphonation to be carried still further in a form which enables a further very material increase of the molecular weight and therewith improvement and variation of the properties of the products. The sulphuric acid halo-hydrins do not act in a merely sulphonating manner but also have a condensing action and it is possible, therefore, to carry out, in addition to the sulphonation, a substantial condensation by treating the fats, tar-fractions or resinous materials to be sulphonated with the sulphuric acid halo-hydrins in the presence of materials to be condensed thereby, such as for example hydrocarbons or their derivatives, alcohols of high molecular weight, aliphatic hydrocarbons, mineral oil fractions, lactones, ketones, carboxylic acids and the like. Such organic compounds as contain hydroxyl, sulphonyl, carbonyl or carboxyl groups are excellently adapted for this condensation with the fatty, mineral oil and resinous substances. It is possible in this manner materially to increase, by the condensing action of the sulphuric acid halo-hydrins, the molecular weight of the fatty, mineral oil and resinous materials apart from the simultaneous sulphonation by the addition of further groups by way of the condensation. It has already been proposed to use chloro-sulphonic acid as a sulphonation agent, in sulphonation of certain aromatic bodies. It has, however, on account of the energetic nature of the reaction, always been considered necessary to work in the presence of indifferent diluting-agents in order to quiet the reaction. In contra-distinction thereto this invention contemplates that materially more complete sulphonation and, as mentioned above, at the same time valuable condensation may be obtained, without the occurrence of losses due to the formation of worthless resination products, by the use of undiluted sulphuric acid halo-hydrins, particularly chloro-sulphonic acid. For this purpose, it is only necessary for the reaction to be initiated with a certain amount of care, as is usually the case with energetic chemical reactions, an excessive temperature increase being prevented by cooling and, again as is generally usual, the sulphonating agent being added in proportions depending upon the measure of the resulting reaction-temperature.

A few examples will be given below of the various possibilities in the performance of the process.

Example I

Castor oil or oleine is mixed with about 80–100% of chloro-sulphonic acid, care being taken, by cooling and careful control of the inflow of the chloro-sulphonic acid, that the temperature does not exceed 40° C. Standing over night is then of advantage in order to allow the sulphonation to become complete. If in view of the purpose of its use the degree of purity of the direct sulphonation product is sufficient then this product may, even without special purification, be wholly or partially neutralized. Products clearly soluble in water result. If necessary, the products may be further purified by being treated with lime. An amount of gypsum corresponding to the excess sulphuric acid then separates out, while the soluble calcium-salt of the resulting sulpho-acid, or of the resulting mixture of sulpho acids, is contained in the liquid. This calcium salt may then be treated with sodium carbonate and converted into the sodium salt, calcium carbonate separating out.

A certain purification may also be attained even by salting-out with very concentrated salt solutions. As to how far the product is used in its crude state or is subjected to purification depends, naturally, upon the purpose for which it is intended that the product should be used.

The sulpho-acids, like their alkali, alkali earth and metal salts, dissolve in water and alkali solutions of the highest concentration without giving precipitates. The solutions foam strongly and have excellent washing, emulsifying and wetting properties. Fatty substances, mineral oils, hydrocarbons, substituted or hydrogenated hydrocarbons, alcohols, hydrogenated phenols, ketones, chlorhydrins and mixtures of such solvent agents may be converted by means of the sulpho-acids and their salts into aqueous dispersions which are obtained in part as permanent emulsions and in part as clear pseudo-solutions which may be mixed to form a clear or milky mixture with water. Such mixtures are suitable, similarly, as purifying, emulsifying and wetting agents, as a boring oil, in leather-oiling, spinning lard and the like.

Example II 150 parts by weight of chloro-sulphonic acid are introduced slowly with continuous agitation into 100 parts by weight of anyhdrous wool-fat, a temperature of 30–35° C. being maintained. The mass of a glue-like consistency at first, soon goes into a more liquid condition and at the end of the sulphonation represents a viscous, dark oil. After standing for 12–24 hours the reaction product is taken up with water and neutralized or may, on the other hand, be purified in the manner described in Example I, if the purpose of its use requires this. The resulting solutions may, in certan cases after bleaching, be evaporated at normal pressure or in vacuo for the purpose of producing the dry salts. This use of the wool fat not only yields extremely valuable sulpho-acids which are materially cheaper than, for example, the napthalene sulpho-acids having alkyl side chains, but also the said use of wool fat for this purpose constitutes at the same time a solution of the problem of the most appropriate utilization of a product which is difficult to handle and which, due to its high content of non-saponifiable substances, has not hitherto been generally used for the preparation of soaps or textile oils. It is possible by the energetic action of chloro-sulphonic acid, to condense the non-saponifiable part of the wool-fat with the saponifiable and sulphonatable part and so to convert the whole into uniform products clearly soluble in water. In this treatment of wool fat separation of the saponifiable fatty acid and the neutral fats from the non-saponifiable or difficultly saponifiable cholesterins, and hydrocarbons, necessary in the older practice, may therefore be omitted. Naturally, however, the individual constituents of the complex wool fat, for example wool-oleine, recovered from the wool fat, in known manner by previous distillation may be subjected to the sulphonation in the same manner and this will result, similarly, in products which are extraordinarily appropriate for the purposes mentioned at the commencement. Such products, also, are of particular value as means for protecting fibre in the treatment of alkali-sensitive fibres such as wool, silk, hair and the like and further as lipolytics.

The sulphonation of artificial or natural mixtures of the neutral fats (that is fatty acid esters of glycerine, also of the higher alcohols of cholesterin and the like) and also the sulphonation of the fatty acids of the fat and wax-like materials lead to sulpho-products of excellent properties as is the case with the complex wool fat when sulphonated with sulphuric acid halohydrins. As further examples of such originating materials the following may be mentioned besides the fats and fatty acids:—Oxy-fatty acids, resins and their distillation products, blubbers, naphthene acids, also bituminous substances of high molecular weight, their distillation products, petroleum fractions, petroleum distillation residues and the like.

Example III

High boiling mineral oil fractions are treated with 100 to 200% of chloro-sulphonic acid under cooling and with slow addition of the sulphonating agent; this is carried out in such a manner that the temperature does not materially exceed 30–35° (and that the evolution of hydrochloric acid accompanying the process is not too energetic). For the purpose of completing the sulphonation the mixture is advantageously allowed to stand for 12–24 hours and is then treated, if necessary, as described in Examples I and II. The treatment of the higher fractions of brown-coal tar as also of any bituminous substances, paraffin oils and vaseline oils and the like is effected in the same manner.

Example IV

One molecule of technical oleic acid is mixed with a molecule of benzol and treated, under agitation and careful cooling with two molecules of chloro-sulphonic acid. The cooling and the introduction of the chloro-sulphonic acid are so controlled that the reaction temperature does not exceed 35° C. After 12 hours standing the reaction product is taken up with water and neutralized or is first purified in the above described manner. The behaviour of these sulpho acids which result from simultaneous sulphonation and condensation is, in essentials, the same as that of the sulpho acids which are described in the Examples I to III.

Example V

A mixture of 50 parts by weight of a clear mineral oil and 10 parts by weight of i-propyl-alcohol was sulphonated within six hours at about 35° with 90 parts by weight of chloro-sulphonic acid. After a further 18 hours action the evolution of hydrochloric acid had ended and the crude sulpho-acid was dissolved in water, neutralized with soda lye, and, after boiling for a short while, separated from the unsulphonated parts of the oil. On evaporation a brownish salt of excellent resistance to lime, salts, lyes and dilute acids resulted from the solution. The remaining properties and possibilities of use are the same as with the above described products. In place of propyl-alcohol other alcohols, ketones, phenols and carboxylic acids may naturally be employed for the condensation within the meaning of the example, also wax alcohols of high molecular weight, hydro-aromatic alcohols and ketones (cyclo-hexanol and cyclo-hexanone) and finally carboxylic acids of all kinds, such as butyric acid, lactic acid, halogenic carboxylic acids such as chloro-acetic acids, all of which according to this method enter the molecule of the fatty substance to be sulphonated.

*Example VI*

50 parts by weight of castor oil are carefully mixed with 15 parts by weight of acetic acid anhydride and treated at 25-30° C. with 30 parts by weight of chloro-sulphonic acid under good cooling and agitation. It is evident that the acetic acid enters into the molecule by condensation apart from a slight residue. The sulpho-acid washed with salt solution and freed from sulphuric acid and uncondensed acetic acid residues may be neutralized with soda lye to give an oil-like product which differs from the known Turkey-red oils by its great resistance towards lime, magnesium salts, acids and alkalies.

*Example VII*

100 parts by weight of wool oleine with about 50% of non-saponifiable constituents are well mixed with 15 parts by weight of lactic acid, condensed under cooling and agitation with 150 parts by weight of chloro-sulphonic acid and sulphonated. The product, in which the lactic acid radicle is introduced by condensation into the fatty acid molecule, is taken up with water, treated with lime in known manner and the lime-salt converted into the sodium salt by means of soda. The sodium salt may be conveniently isolated as a yellow brown powder by evaporating the solution in vacuo.

The sulpho-acids produced according to the above described process have it in common that they are, as indicated preliminarily, suitable in a high degree as purifying, emulsifying and wetting agents, as protective agents for fibres, as agents for splitting fats and as stabilizing agents for dye stuff solutions. They are, therefore, intended to be a solution of the various problems which arise in the paper, textile and leather industries.

In conclusion it must further be remarked that in the above described processes, the sulphuric acid halohydrins, such as for example chloro-sulphonic acid may be replaced wholly or in part by mixtures of two substances, one of which acts in a sulphonating manner and the other in a condensing manner, such as for example, sulphuric acid mono-hydrate and phosphorus pentoxide. Similar to the latter is also the action of meta-phosphoric acid, phosphoric acid trichloride, phosphorus oxychloride, anhydrous potassium sulphate, sodium sulphate or the like. Fuming sulphuric acid may also be employed as the sulphonating agent in place of sulphuric acid monohydrate and the claims are to be read as covering the use of such equivalent substances.

In the claims and specification where I use the term "sulphuric acid halohydrin" I wish to designate acids such as chloro-sulfonic acid $=ClSO_2OH$ and those having other halogens in place of chlorine.

I claim:—

1. The process of sulphonating which comprises treating a material selected from the group consisting of wool fat, individual constituents of wool fat containing alcohols, wax alcohols, and cholesterin with chloro-sulphonic acid while preventing excessive rise in temperature.

2. The process of sulphonating according to claim 1 in which the sulphonation of the material is conducted in the presence of another organic material capable of forming a condensation product therewith.

3. The process of sulphonating which comprises treating a material selected from the group consisting of wool fat, individual constituents of wool fat containing alcohols, wax alcohols and cholesterin with undiluted chlorosulphonic acid while preventing excessive rise in temperature.

4. The process of sulphonating according to claim 3 in which the sulphonation of the materials is conducted in the presence of another organic material capable of forming a condensation product therewith.

5. The process of sulphonating which comprises treating a material selected from the group consisting of wool fat, constituents of wool fat containing alcohols, wax alcohols and cholesterin with a sulphuric acid halohydrin while preventing excessive rise in temperature.

6. Products having the same properties and composition as the sulphonated products prepared in accordance with process defined by claim 5.

7. The salts of products having the same properties and composition as the sulphonated products prepared in accordance with process defined by claim 5.

8. The process of sulphonating which comprises treating a material selected from the group consisting of wool fat, constituents of wool fat containing alcohols, wax alcohols and cholesterin with an undiluted sulphuric acid halohydrin while preventing excessive rise in temperature.

9. The process of sulphonating which comprises reacting upon a material selected from the group consisting of wool fat, constituents of wool fat containing alcohols, wax alcohols, cholesterin, neutral fats, and fatty acids with a sulphuric acid halohydrin in the presence of a condensable compound.

10. Products having the same properties and composition as the sulphonated products prepared in accordance with process defined by claim 9.

11. The salts of products having the same properties and composition as the sulphonated products prepared in accordance with process defined by claim 9.

12. The process of sulphonating which comprises reacting upon a material selected from the group consisting of neutral fats and fatty acid with a sulphuric acid halohydrin in the presence of a condensable substance.

13. The sulphonation product of a higher alcohol which contains at least one $SO_3H$ group attached to a carbon atom.

14. The condensation product of a sulphonation product of a higher alcohol which contains at least one $SO_3H$ group attached to a carbon atom.

15. The sulphonation product of a wax alcohol which contains at least one $SO_3H$ group attached directly to a carbon atom.

16. The condensation product of a sulphonation product of a wax alcohol which contains at least one $SO_3H$ group attached directly to a carbon atom.

KURT LINDNER.